Aug. 17, 1965  A. L. GURSHA  3,201,117
STICK HORSE
Filed April 2, 1963
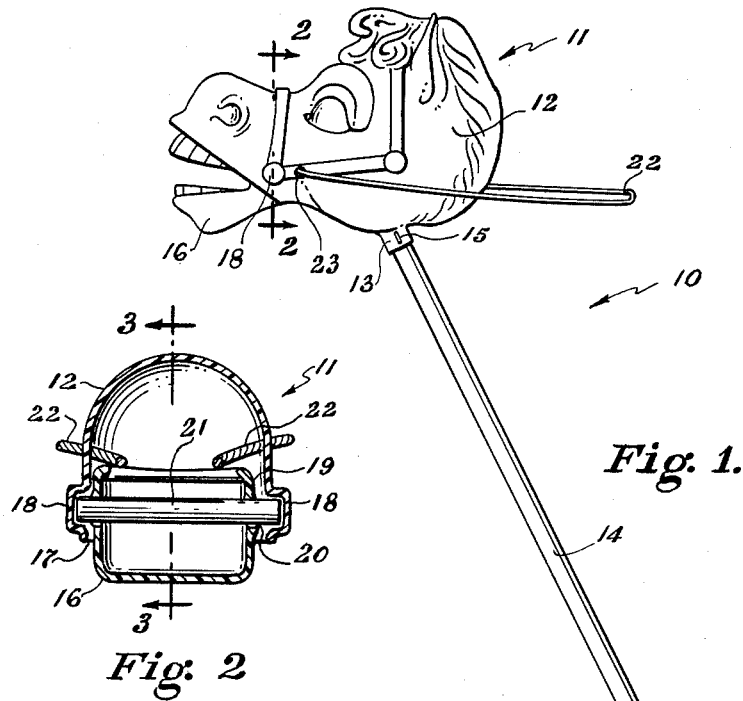
Fig. 1.
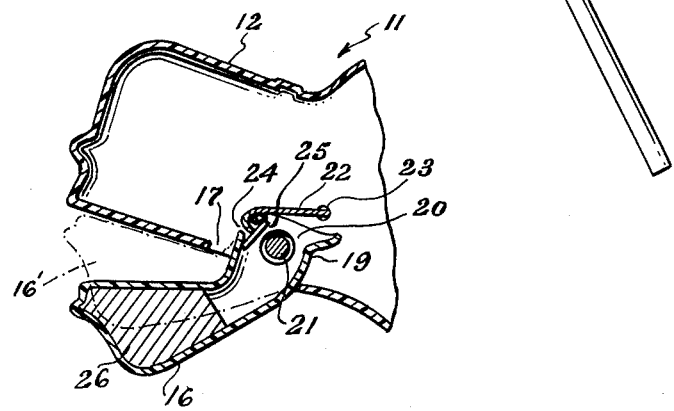
Fig. 2.
Fig. 3.
INVENTOR.
ALVIN L. GURSHA
BY
ATTORNEY

United States Patent Office 3,201,117
Patented Aug. 17, 1965

3,201,117
STICK HORSE
Alvin L. Gursha, Amsterdam, N.Y., assignor to Bayshore Industries, Incorporated, Amsterdam, N.Y., a corporation of Maryland
Filed Apr. 2, 1963, Ser. No. 269,929
2 Claims. (Cl. 272—1)

This invention relates generally to children's toys, and more particularly is directed to improvements in toys of the type known as stick horses.

An object of the invention is to provide a stick horse with enhanced play or entertainment value by forming the head thereof with an articulated portion, preferably simultating the lower jaw thereof, and by connecting the reins to such articulated portion so as to effect movement of the latter relative to the remainder of the head in response to tugging on the reins.

Another object is to provide a stick horse having the above functional feature, and which is constructed and arranged so as to be relatively inexpensive to produce and yet sturdy and reliable in operation.

The above, and other objects, features and advantages of the invention, will be apparent in the following detailed description of an illustrative embodiment thereof which is to be read in connection with the accompanying drawing, forming a part hereof and wherein:

FIG. 1 is a side elevational view of a stick horse embodying this invention;

FIG. 2 is an enlarged transverse sectional view taken along the line 2—2 on FIG. 1; and FIG. 3 is a sectional view taken along the line 3—3 on FIG. 2, and showing two extreme positions of the pivotally suspended portion of the head in full lines and broken lines, respectively.

Referring to the drawing in detail, and initially to FIG. 1 thereof, it will be seen that a stick horse embodying this invention, and there generally identified by the reference numeral 10, comprises a head 11 in the form of a fanciful simulation of the head of a horse. The head 11 includes a hollow body 12 molded or otherwise suitably formed of a rigid plastic material and provided with an integral tubular extension 13 in which the upper end of an elongated wooden stick 14 is permanently attached, for example, as by staples 15. The tubular extension 13 of head 11 is oriented with respect to the body 12 so that the stick 14 will extend downwardly and rearwardly from head 11 in the normal position of use of the stick horse 10, as shown on FIG. 1.

In accordance with this invention, the head 11 further includes a separately formed hollow portion 16 molded or otherwise suitably formed of a rigid plastic material which may be the same as that used for the body portion 12, and which may be shaped to simulate the lower jaw of a horse, as in the illustrated embodiment of the invention.

As shown particularly on FIG. 3, the hollow body 12 has a generally downwardly facing opening 17 extending across the back of the upper jaw part of body 12, and the latter is further formed, at its opposite sides, with inwardly opening sockets or hollow bosses 18 at locations above opening 17. The lower jaw simulating portion 16 has an upwardly directed part 19 at its back end which extends upwardly through opening 17 into the hollow interior of the body 12 and has laterally aligned openings 20 in its opposite sides. The lower jaw simulating portion 16 is conveniently suspended from the body 12 by means of an axle 21, which may be formed of wooden doweling, and which passes through the openings 20 and has its opposite ends seated in the sockets 18. In assembling together the portion 16 and body 12 of head 11, the axle 21 is initially passed through the openings 20 of portion 16 and is inserted in the sockets 18 by spreading apart the sides of body 12 at the opening 17 thereof.

It will be apparent that the mounting of lower jaw simulating portion 16 on axle 21 seated in sockets 18 of body 12 serves to pivotally suspend portion 16 from body 12. Since the pivoting axis of portion 16 is disposed at the back of the latter, the portion 16 will normally tend to swing downwardly to the position shown on FIG. 1 and in full lines on FIG. 3, where portion 16 engages against the back edge of opening 17 which thereby limits the downward swinging movement of the lower jaw simulating portion.

In order to provide for actuation of the portion 16 between its lowermost position, where the mouth of the stick horse appears to be open, and an elevated or raised position, as shown in broken lines at 16' on FIG. 3, which corresponds to a closed-mouth position, the stick horse 10 further includes reins 22 preferably constituted by a length of multi-colored braided rope. The end portions of reins 22 pass slidably through openings 23 formed in the opposite sides of body 12 of head 11 at locations spaced rearwardly from the sockets 18. The ends of reins 22 are attached to the lower jaw-simulating portion 16 at locations above and in front of openings 20 of the latter. For example, as shown on FIG. 3, the ends of reins 22 can be conveniently extended inwardly through openings 24 provided in the front wall of the upwardly directed back part 19 of portion 16 and then clamped in transversely extending split tubes 25 of metal or the like which are of sufficient length to prevent the withdrawal of the related ends of reins 23 through openings 24. The threading of reins 22 through openings 23 and the attachment of its end portions to member 16 are preferably effected prior to the pivotal connection of the latter to head portion 12, as described above. In order to promote the gravitational movement of portion 16 to its lowered or mouth-open position, the lower jaw simulating portion may be weighted at its front end, for example, by a mass 26 of plaster of Paris or other suitably heavy material disposed in its hollow interior.

It will be apparent that, when a child astride the stick 14 runs, skips or gallops and tugs on the reins 22, such tugging on the reins will exert a turning moment on lower jaw simulating portion 16 to move the latter from its lowered or mouth-open position, shown in full lines on FIG. 3, to its raised or mouth-closed position indicated in broken lines at 16' on FIG. 3. When the pull on reins 22 is relaxed, the weight of the lower jaw-simulating portion 16, particularly in view of the mass 26 therein, will be sufficient to return the portion 16 to its lowered position. Thus, tugging on reins 22 during normal use of stick horse 10 will effect closing and opening of the mouth of the horse, thereby lending realism to the action of the stick horse and correspondingly enhancing the play and entertainment value thereof.

Although the head 11 of the illustrated embodiment of the invention is shown formed so as to simulate the head of a horse, it is to be understood that the head 11 may be formed to simulate other animals. It is also to be noted that other changes and modifications may be effected in the illustrated embodiment by one skilled in the art without departing from the scope or spirit of the invention, except as defined in the appended claims.

What is claimed is:

1. In a stick horse, the combination of a hollow body shaped to simulate the head of an animal with the lower jaw missing, said body having a downwardly facing opening at the back of the portion thereof corresponding to the upper jaw and inwardly opening sockets in the opposite sides of said body above said opening, a lower jaw simulating member having an upwardly directed back end portion extending into said opening of the body and having laterally aligned openings, an axle extending through said openings of said lower jaw simulating member and having its opposite ends seated in said sockets to pivotally suspend said member from said body for movement between a mouth-open position, to which said member is gravitationally urged, and a raised mouth-closed position contacting said upper jaw portion of the hollow body, said body having additional openings in the sides thereof in back of said sockets, and reins extending from the rear of said body through said additional openings of the body and connected to said upwardly directed back end portion of the lower jaw simulating member above and in front of said axle so that tugging on said reins causes said movement of the member to said mouth-closed position.

2. In a stick horse, the combination of a hollow body shaped to simulate the head of an animal with the lower jaw missing, said body having a downwardly facing opening at the back of the portion thereof corresponding to the upper jaw and inwardly opening sockets in the opposite sides of said body above said opening, a lower jaw simulating member having a back end portion which is angled upwardly relative to the remainder of said member and extends into said opening, pivot means extending from the opposite sides of said back end portion and being seated in said sockets to pivotally suspend said member from said body for movement between a mouth-open position to which said member is gravitationally urged and a raised mouth-closed position at which said member engages upwardly against said upper jaw portion of the body, said body having additional openings in the sides thereof at locations in back of said sockets, and reins extending from in back of said body through said additional openings and connected to said upwardly angled back end portion of the lower jaw simulating member above and in front of said pivot means so that tugging on said reins causes said movement of the member to said mouth-closed position.

References Cited by the Examiner

UNITED STATES PATENTS

| | | | |
|---|---|---|---|
| 385,910 | 7/88 | Clark | 46—97 |
| 2,095,871 | 10/37 | Hite | 272—53.2 |
| 2,840,377 | 6/58 | Jenks | 272—1 |

RICHARD C. PINKHAM, *Primary Examiner.*